Patented Sept. 11, 1945

2,384,572

UNITED STATES PATENT OFFICE 2,384,572

COPOLYMERS OF BUTADIENE-1,3 HYDROCARBONS AND OTHER ORGANIC COMPOUNDS

Waldo L. Semon, Silver Lake, Ohio, assignor to The B. F. Goodrich Company, New York, N. Y., a corporation of New York No Drawing. Application January 24, 1942, Serial No. 428,083

14 Claims. (Cl. 260—66)

This invention relates to the copolymerization of butadiene-1,3 hydrocarbons with other unsaturated organic compounds and to the new class of resinous or rubbery copolymers obtainable thereby.

It is known that butadiene-1,3 hydrocarbons such as butadiene-1,3 and isoprene may be copolymerized with various unsaturated compounds which, in general, contain the group

and no other carbon to carbon double bond, to form products which, depending on the relative proportions of the monomers utilized, are either rubbery or resinous in properties. For example, the copolymerization of butadiene-1,3 with a smaller amount by weight of methyl methacrylate yields a synthetic rubber while the copolymerization of butadiene-1,3 with a larger amount of methyl methacrylate yields a moldable synthetic resin.

I have now discovered that butadiene-1,3 hydrocarbons, by which is meant butadiene-1,3 and its homologs which polymerize in essentially the same manner such as isoprene, 2,3-dimethyl butadiene-1,3 and piperylene, may be copolymerized with other organic compounds of an entirely different class to form new rubbery or resinous copolymers which are, for many purposes, superior to those heretofore known.

This new class of compounds which have been found to be copolymerizable with butadiene-1,3 hydrocarbons may be defined broadly as neutral organic compounds, composed of carbon, hydrogen and oxygen, which contain at least two carbon to carbon double bonds separated by at least one intervening atom so that they do not form a conjugated system, each of said double bonds occuring in a resinophoric group. The term "resinophoric group" is user herein in its ordinary sense to designate a chemical grouping in an organic compound which substantially increases the tendency of that compound to polymerize. The only resinophoric groups which may possibly be present in the structures of compounds of this class are groups in which a carbon to carbon double bond occurs at the end of a carbon chain as in the structure

and groups in which a carbon to carbon double bond occurs adjacent to (conjugated with) a carbon to oxygen double bond as in the structure

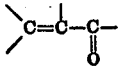

Included in the above-defined class are neutral organic compounds composed of carbon, hydrogen and oxygen, such as esters, ketones and ethers, which contain at least two

groups separated by at least one intervening atom; similar compounds which contain at least one

group and at least one

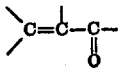

group separated therefrom by at least one intervening atom and similar compounds which contain at least two carbon to carbon double bonds separated by at least one intervening atom each of which is conjugated with a carbon to oxygen double bond. Representative examples of specific compounds included in this class are: vinyl, allyl or 3-butenyl esters of polybasic acids such as succinic, adipic, citric, tartaric, phthalic, azelaic, itaconic, fumaric or maleic acids, all of which esters contain at least two

groups separated by the ester linkage; acrylic and substituted acrylic esters of polyhydric alcohols such as glycol, glycerine, diethylene glycol and trimethylene glycol and allyl, vinyl or 3-butenyl esters of alpha-beta unsaturated carboxylic acids such as acrylic, methacrylic, ethacrylic or crotonic acids, all of which contain at least one

group and at least one other carbon to carbon double bond which in this case not only has the

structure but is at the same time conjugated with a carbon to oxygen double bond; divinyl, diallyl, and di-isopropenyl ketones, all of which contain at least two carbon to carbon double bonds which are at the end of a chain and are at the same time conjugated with the carbonyl group, and divinyl or diallyl ether or the polyvinyl ethers of polyhydric alcohols or phenols such as ethylene glycol, diethylene glycol or hydroquinone, all of which contain at least two

groups separated by the ether linkage. The preferred materials are the relatively low molecular weight esters, ketones or ethers in this class; i. e., those containing no more than ten carbon atoms. For convenience, these compounds are sometimes referred to hereinafter as oxygen-containing monomers.

In the process of this invention a compound in the above class of oxygen-containing monomers is mixed with a butadiene-1,3 hydrocarbon and the resulting mixture is polymerized. The proportion in which the compounds are mixed determines to a large extent the nature of the copolymer. For example if over 50%, preferably from 60 to 80%, by weight of the mixture consists of a butadiene-1,3 hydrocarbon the copolymer formed by the polymerization of the mixture is rubbery in nature and may be used as a synthetic rubber. If over 50%, preferably from 60 to 80%, by weight of the mixture consists of the oxygen-containing monomer, however, the product is a resinous material useful as a molding composition. In any event it is obviously necessary to employ a substantial amount of each of the monomers in order to obtain a true copolymer, however, as little as 5% of the monomer present in the lesser amount may be employed. It is also sometimes desirable to include a monomer containing a

group and no other carbon to carbon double bond, such as styrene, acrylonitrile, methyl methacrylate, acrylic acid, vinyl chloride, vinylidene chloride or the like, in the mixture together with the oxygen-containing monomer and the butadiene-1,3 hydrocarbon in which case multipolymers of a variety of properties are formed by the polymerization. For example, the polymerization of a mixture containing 60% by weight of butadiene-1,3, 20% by weight of acrylonitrile and 20% by weight of vinyl crotonate yields a plastic synthetic rubber which, because of the presence of the acrylonitrile, is also somewhat oil resistant.

The polymerization of the above mixtures of monomers may be carried out by a number of different methods. For example, polymerization may be effected in homogeneous system by the application of heat, actinic light or pressure to the mixture either alone or in the presence of a solvent and either with or without the presence of a compound which initiates the polymerization reaction. It is preferred, however, to carry out the polymerization in the form of an aqueous emulsion in the presence of a suitable emulsifying agent and a polymerization initiator.

Emulsifying agents which may be employed in the emulsion polymerization process include fatty acid soaps such as sodium oleate, sodium palmitate or sodium stearate; aryl sulfonates such as sodium isopropyl naphthalene sulfonate; aliphatic sulfates such as sodium lauryl sulfates and salts of high molecular weight organic bases such as the hydrochloride of diethylaminoethyloleylamide and cetyltrimethylammonium methyl sulfate.

Polymerization initiators which may be used in either the homogeneous polymerization process or the emulsion polymerization process include benzoyl peroxide, potassium persulfate, hydrogen peroxide and other per-type oxygen containing compounds as well as other types of polymerization initiators such as diazoamino benzene and dipotassium diazomethane disulfonate. Those soluble in the monomers such as benzoyl peroxide are preferably used in the homogeneous process while those soluble in water such as hydrogen peroxide are preferably used in the emulsion process. Other substances which speed up the polymerization reaction or which improve the quality of the products may also be present during the polymerization if desired.

The temperature and time necessary to bring about the copolymerization of the butadiene-1,3 hydrocarbon and the oxygen containing compound varies somewhat depending upon the method of polymerization and the substances present during the polymerization. In general it is necessary to use temperatures of about 100° C. or even higher when the homogeneous method of polymerization is used and to carry out the polymerization for 5–50 hours while with the emulsion polymerization process the temperature is preferably from 20–80° C. and the time of polymerization varies from 10 to 100 hours.

In order further to illustrate and clarify my invention the following examples are given although it is to be understood that the invention is not to be limited in any way by the details therein set forth.

*Example 1*

A mixture consisting of 75 parts by weight of butadiene-1,3 and 25 parts by weight of allyl crotonate are emulsified with 250 parts of a 2% aqueous solution of the hydrochloride of diethylaminoethyloleylamide, 2 parts by weight of benzoyl peroxide being present as an initiator. The resulting emulsion is allowed to polymerize, with constant agitation, for 2½ days at a temperature of 60° C. A latex like mass is thus obtained which, after the addition of 2 parts of phenyl beta naphthylamine, is coagulated with alcohol. A soft, plastic synthetic rubber which may be milled and otherwise processed in the same manner as natural rubber is obtained. When compounded and vulcanized in the manner customary with natural rubber, this copolymer yields vulcanizates of good elasticity and satisfactory tensile strength.

*Example 2*

Example 1 is repeated except that 50 parts by weight of butadiene-1,3 and 50 parts by weight of allyl crotonate are employed. The product is a sticky, waxy, somewhat rubbery material which although not suitable as a synthetic rubber may be used in adhesive compositions.

*Example 3*

Seventy-five parts by weight of butadiene and 25 parts by weight of diallyl adipate are emulsified with 150 parts of a 5% aqueous solution of sodium isopropyl naphthalene sulfonate. 2 parts of benzoyl peroxide are added and the emulsion is polymerized for 2 days at 60° C. Coagulation of the emulsion with acetic acid and salt produces a soft, tacky, rubbery solid. It may be milled without difficulty and may be compounded and vulcanized in the same manner as natural rubber. Other diallyl esters which may be substituted for diallyl adipate in this example with similar results include diallyl phthalate, diallyl maleate, diallyl succinate, triallyl citrate and diallyl itaconate.

Example 4

A mixture of 75 parts of diallyl adipate, 25 parts of butadiene-1,3 and 5 parts of benzoyl peroxide is heated at 150° C. for about 10 hours. The product is a white, tough, solid substance which is useful as a molding composition.

Example 5

A mixture of 75 parts by weight of butadiene-1,3 and 25 parts by weight of allyl methacrylate is polymerized in aqueous emulsion in presence of a fatty acid soap and hydrogen peroxide. A good yield of a plastic synthetic rubber is obtained.

Example 6

A mixture of 60 parts by weight of diallyl ketone and 40 parts by weight of butadiene-1,3 is polymerized in homogeneous system. A white solid resinous copolymer is obtained as the product.

Although I have specifically described only representative embodiments of my invention it will be apparent to those skilled in the art that many other materials, proportions and polymerization conditions may be employed without departing from the spirit and scope of my invention.

This application is a continuation-in-part of my copending application Serial No. 322,381, filed March 5, 1940.

I claim:

1. The process which comprises polymerizing a mixture including from 5 to 95% by weight of a butadiene-1,3 hydrocarbon and from 5 to 95% by weight of a neutral organic compound composed of carbon, hydrogen, and oxygen, and containing an oxygen-containing structure selected from the class consisting of

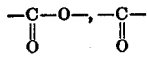

and —O—, the said oxygen-containing structure being connected by each of its valences to a radical containing an olefinic carbon to carbon double bond present in a group selected from the class consisting of

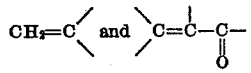

2. The process which comprises polymerizing in aqueous emulsion a mixture including from 5 to 95% by weight of butadiene-1,3 and from 5 to 95% by weight of a neutral organic compound composed of carbon, hydrogen, and oxygen, and containing an oxygen-containing structure selected from the class consisting of

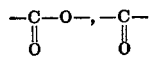

and —O—, the said oxygen-containing structure being connected by each of its valences to a radical containing an olefinic carbon double bond present in a group selected from the class consisting of

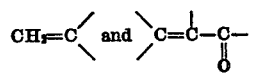

3. The process which comprises polymerizing a mixture including from 5 to 95% by weight of a butadiene-1,3 hydrocarbon and from 5 to 95% by weight of a ketone composed of carbon, hydrogen, and oxygen, and containing the keto group,

connected by each of its valences to a radical containing a

group.

4. The process which comprises polymerizing a mixture including from 5 to 95% by weight of a butadiene-1,3 hydrocarbon and from 5 to 95% by weight of an ester composed of carbon, hydrogen and oxygen and containing the ester grouping,

connected, by the valence on the oxygen atom, to a radical containing a

group and, by the valence on the carbon atom, to a carbon atom in turn connected by an olefinic double bond to another carbon atom.

5. The process which comprises polymerizing in aqueous emulsion a mixture including from 50 to 95% by weight of butadiene-1,3 and from 5 to 50% by weight of an ester composed of carbon, hydrogen and oxygen and containing the ester grouping,

connected by the valence on the oxygen atom to a radical containing a

group and, by the valence on the carbon atom, to a carbon atom in turn connected by an olefinic double bond to another carbon atom.

6. The process which comprises polymerizing in aqueous emulsion a mixture containing butadiene-1,3 and an allyl ester of an alpha-beta unsaturated monocarboxylic acid, said mixture containing from 50 to 95% by weight of butadiene-1,3 and from 5 to 50% by weight of the said ester.

7. The process which comprises polymerizing in aqueous emulsion a mixture containing at least 50% by weight of butadiene-1,3 and at least 5% by weight of allyl crotonate.

8. The process which comprises polymerizing a mixture including from 5 to 95% by weight of butadiene-1,3 and from 5 to 95% by weight of diallyl ketone.

9. A product prepared by the polymerization of a mixture including from 5 to 95% of a butadiene-1,3 hydrocarbon and from 5 to 95% by weight of a neutral organic compound composed of carbon, hydrogen, and oxygen, and containing an oxygen-containing structure selected from the class consisting of

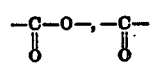

and —O—, the said oxygen-containing structure being connected by each of its valences to a radical containing an olefinic carbon to carbon double bond present in a group selected from the class consisting of

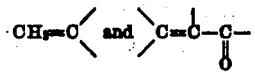

10. A product prepared by the polymerization of a mixture including from 5 to 95% by weight of a butadiene-1,3 hydrocarbon and from 5 to 95% by weight of a ketone composed of carbon, hydrogen, and oxygen, and containing the keto group,

connected by each of its valences to a radical containing a

group.

11. A product prepared by the polymerization of a mixture including from 5 to 95% by weight of a butadiene-1,3 hydrocarbon and from 5 to 95% by weight of an ester composed of carbon, hydrogen and oxygen and containing the ester grouping,

connected, by the valence on the oxygen atom, to a radical containing a

group and, by the valence on the carbon atom, to a carbon atom in turn connected by an olefinic double bond to another carbon atom.

12. A rubbery product prepared by the polymerization of a mixture containing butadiene-1,3 and an allyl ester of an alpha-beta unsaturated monocarboxylic acid, said mixture containing from 50 to 95% by weight of butadiene-1,3 and from 5 to 50% by weight of said ester.

13. A rubbery product prepared by the polymerization of a mixture containing at least 50% by weight of butadiene-1,3 and at least 5% by weight of allyl crotonate.

14. A product prepared by the polymerization of a mixture including from 5 to 95% by weight of butadiene-1,3 and from 5 to 95% by weight of diallyl ketone.

WALDO L. SEMON.